United States Patent
Ang

(10) Patent No.: US 8,054,361 B2
(45) Date of Patent: *Nov. 8, 2011

(54) INCREASING READOUT SPEED IN CMOS APS SENSORS THROUGH BLOCK READOUT

(75) Inventor: Lin-Ping Ang, Montrose, CA (US)

(73) Assignee: Round Rock Research, LLC, Mt. Kisco, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/566,814

(22) Filed: Sep. 25, 2009

(65) Prior Publication Data

US 2010/0103301 A1    Apr. 29, 2010

Related U.S. Application Data

(63) Continuation of application No. 10/983,083, filed on Nov. 8, 2004, now Pat. No. 7,671,914, which is a continuation of application No. 09/274,739, filed on Mar. 23, 1999, now Pat. No. 6,847,399.

(60) Provisional application No. 60/079,046, filed on Mar. 23, 1998.

(51) Int. Cl.
*H04N 3/14* (2006.01)
*H04N 5/335* (2006.01)

(52) U.S. Cl. ........ 348/308; 348/302; 348/304; 348/307; 348/241; 348/246; 348/294; 250/208.1

(58) Field of Classification Search .................. 348/308, 348/302, 304, 307, 241, 248, 294; 250/208.1
See application file for complete search history.

(56) References Cited

U.S. PATENT DOCUMENTS

| | | | |
|---|---|---|---|
| 4,122,311 A | 10/1978 | Klatt et al. |
| 4,737,854 A | 4/1988 | Tandon et al. |
| 4,835,404 A | 5/1989 | Sugawa et al. |
| 4,914,519 A | 4/1990 | Hashimoto et al. |
| 5,081,536 A | 1/1992 | Tandon et al. |
| 5,148,268 A | 9/1992 | Tandon et al. |
| 5,172,249 A | 12/1992 | Hashimoto |
| 5,317,406 A | 5/1994 | Kobayashi et al. |
| 5,434,619 A | 7/1995 | Yonemoto |

(Continued)

FOREIGN PATENT DOCUMENTS

EP    0 616 464 A2    9/1994

(Continued)

OTHER PUBLICATIONS

Mendis et al., "CMOS Active Pixel Image Sensor," IEEE Transactions on Electron Devices, vol. 41, No. 3, Mar. 1994.

(Continued)

*Primary Examiner* — David L Ometz
*Assistant Examiner* — Antoinette T Spinks
(74) *Attorney, Agent, or Firm* — Lerner, David, Littenberg, Krumholz & Mentlik, LLP

(57) ABSTRACT

A method and associated architecture for dividing column readout circuitry in an active pixel sensor in a manner which reduces the parasitic capacitance on the readout line. In a preferred implementation, column readout circuits are grouped in blocks and provided with block signaling. Accordingly, only column output circuits in a selected block significantly impart a parasitic capacitance effect on shared column readout lines. Block signaling allows increasing pixel readout rate while maintaining a constant frame rate for utility in large format high-speed imaging applications.

56 Claims, 6 Drawing Sheets

U.S. PATENT DOCUMENTS

| | | | |
|---|---|---|---|
| 5,461,425 A | 10/1995 | Fowler et al. | |
| 5,471,515 A | 11/1995 | Fossum et al. | |
| 5,493,423 A | 2/1996 | Hosier | |
| 5,499,215 A | 3/1996 | Hatta | |
| 5,550,653 A | 8/1996 | Tewinkle et al. | |
| 5,631,704 A | 5/1997 | Dickinson et al. | |
| 5,638,121 A | 6/1997 | Hosier et al. | |
| 5,739,562 A | 4/1998 | Ackland et al. | |
| 5,789,736 A | 8/1998 | Kawahara | |
| 5,790,191 A | 8/1998 | Zhang | |
| 5,841,126 A | 11/1998 | Fossum et al. | |
| 5,854,656 A | 12/1998 | Noggle | |
| 5,872,470 A | 2/1999 | Mallinson et al. | |
| 5,894,431 A | 4/1999 | Price | |
| 5,933,189 A | 8/1999 | Nomura | |
| 5,965,871 A | 10/1999 | Zhou et al. | |
| 5,973,311 A | 10/1999 | Sauer et al. | |
| 6,141,045 A | 10/2000 | Tewinkle et al. | |
| 6,320,616 B1 | 11/2001 | Sauer | |
| 6,366,320 B1 | 4/2002 | Nair et al. | |
| 6,369,853 B1 | 4/2002 | Merrill et al. | |
| 6,377,304 B1 | 4/2002 | Saitoh | |
| 6,483,541 B1 | 11/2002 | Yonemoto et al. | |
| 6,512,546 B1 | 1/2003 | Decker et al. | |
| 6,552,324 B1 | 4/2003 | Kothari et al. | |
| 6,661,457 B1 | 12/2003 | Mathur et al. | |
| 6,697,108 B1 | 2/2004 | Chen et al. | |
| 6,747,695 B1 * | 6/2004 | Afghahi | 348/241 |
| 6,784,928 B1 | 8/2004 | Sakurai et al. | |
| 6,831,690 B1 | 12/2004 | John et al. | |
| 6,980,243 B2 | 12/2005 | Miyawaki et al. | |
| 7,154,548 B2 * | 12/2006 | Liu | 348/302 |
| 2002/0021614 A1 | 2/2002 | Kim et al. | |

FOREIGN PATENT DOCUMENTS

| | | |
|---|---|---|
| JP | 63-318875 A | 12/1988 |
| JP | 4-4682 A | 1/1992 |

OTHER PUBLICATIONS

Mendis et al., "Progress in CMOS Active Pixel Image Sensors," Proceedings of the SPIE vol. 2172, Charge-Coupled Devices and Solid State Optical Sensors IV (1994).

Niewiadomski et al., "CMOS Read-Out IC with Op-Amp Pixel Amplifier for Infrared Focal Plane Arrays," Proceedings—Tenth Annual IEEE International ASIC Conference and Exhibit, pp. 69-73, 1997.

J. W. Tipple, "VXI Data Acquisition Handbook," Revision 1.3, KineticSystems Corporation, Feb. 16, 1998.

* cited by examiner

INCREASING READOUT SPEED IN CMOS APS SENSORS THROUGH BLOCK READOUT

CROSS REFERENCE TO RELATED APPLICATIONS

This application is a continuation of application Ser. No. 10/983,083, filed Nov. 8, 2004 now U.S. Pat. No. 7,671,914, which is a continuation of application Ser. No. 09/274,739, filed Mar. 23, 1999 (now U.S. Pat. No. 6,847,399), which claims the benefit of U.S. Provisional Application No. 60/079,046, filed on Mar. 23, 1998. Each of these disclosures are incorporated herein by reference.

FIELD OF THE INVENTION

The present invention relates to CMOS image sensors, and more particularly to methods and associated architectures for reading out data, from such a sensor.

BACKGROUND

The advent of HDTV and other high-end digital imaging systems is increasing demand for large format high speed sensors. CMOS active pixel image sensors which have low power dissipation, are low cost and highly reliable, and which can typically be configured in a single chip solution, are increasingly being developed for large format high speed imaging applications. Large format sensors usually require an image pixel array of at least 1024×1024 pixels in size. Unfortunately, as the image array is made larger, it becomes difficult to increase pixel readout rate without also increasing frame rate because of parasitic capacitance limitations in current architectures.

SUMMARY

The present disclosure describes a method and associated architecture for dividing column readout circuitry in an image sensor in a manner which reduces the parasitic capacitance on the readout line. In a preferred implementation, column readout circuits are grouped in blocks and provided with block signaling. Accordingly, only column readout circuits in a selected block significantly impart a parasitic capacitance effect on shared column readout lines at any point in time. Block signaling was found to increase pixel readout rate while maintaining a constant frame rate for utility in large format high-speed imaging applications.

In accordance with a preferred embodiment, by mathematically modeling the load capacitance and the effective RC constant seen by any column output stage at a particular time and by using a differentiated derived equation, a desirable optimum number of connections per block as well as a desired number of blocks for a given size of column readout circuits can be easily determined.

DETAILED DESCRIPTION OF THE PREFERRED EMBODIMENTS

Figure 1:
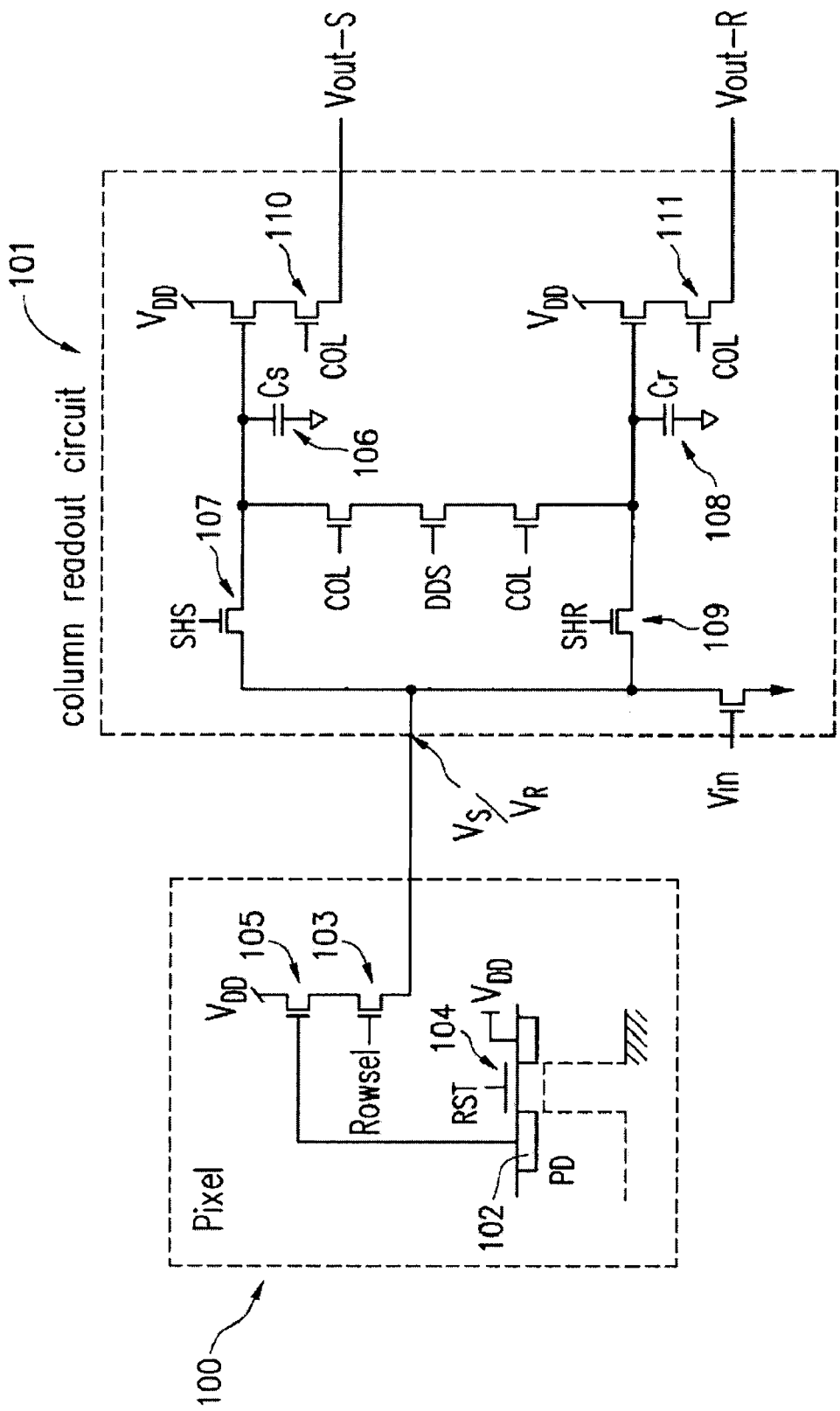
FIG. 1 shows a pixel and corresponding column readout circuit in an active pixel sensor.

A schematic diagram of a conventional CMOS active pixel 100 and associated column readout circuit 101 is shown in FIG. 1. Incident photons on the pixel 101 generate electrons that are collected in the floating diffusion area 102. The charge is buffered by an in-pixel source follower 105. A number of pixels are typically arranged horizontally to form a row of pixels and also vertically to define a column of pixels. Row selection transistor 103 is enabled to allow charge from a given row of pixels to be selectable for readout.

A more detailed discussion of the general principles of pixel readout is provided in U.S. Pat. No. 5,841,126.

While the illustrative implementation shows a photodiode pixel, it should be understood that a photogate, phototransistor or the like could be used instead.

During imaging, the photodiode floating diffusion area 102 is first reset. This is achieved by pulsing a gate of reset transistor 104 to a high voltage, for example VDD. After a period of time, the voltage of the floating diffusion area 102 drops to reflect the number of electrons accumulated in the Floating diffusion area 102. The voltage $V_S$ of the floating diffusion area is then read out from the pixel 100 into the column readout circuit 101 using source follower 105 within pixel 100. Voltage $V_S$ is then sampled onto storage capacitor $C_S$ 106 by enabling the sample-hold signal (SHS) transistor 107.

Figure 2:
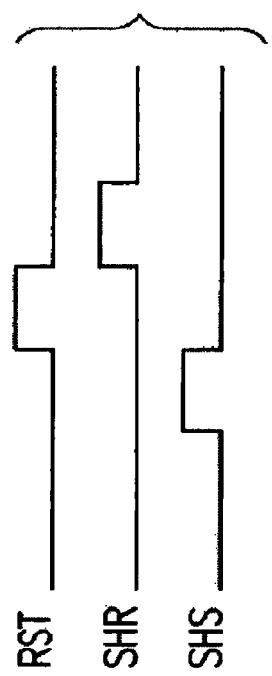
FIG. 2 shows the timing for a photodiode pixel readout operation.

After the signal charge $V_S$ is read out, the pixel 100 is then reset and the gate of reset transistor 104 is again pulsed to a high voltage. The resultant voltage $V_R$ of Floating diffusion area 102 is then read out to the column readout circuit 101 as before. This time the voltage $V_R$ is sampled onto storage capacitor $C_R$ 108 by enabling the sample-hold reset (SHR) transistor 109. FIG. 2 shows the timing for the above photodiode operation.

Figure 3:
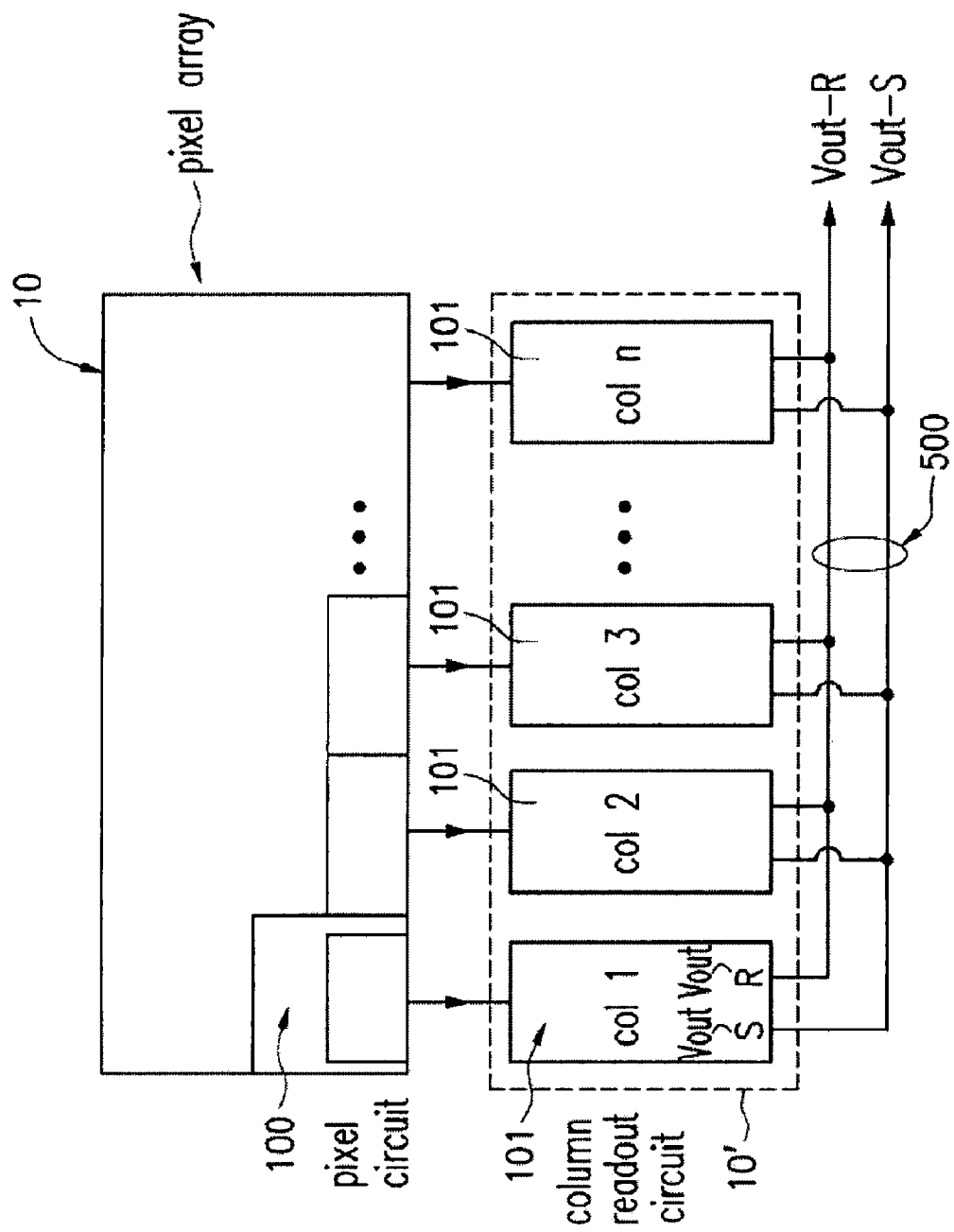
FIG. 3 shows a block diagram of a CMOS active pixel sensor including an array of pixels and corresponding column readout circuits, all coupled to a pair of shared readout lines.

The voltage difference between the voltages stored in the two capacitors, $C_S$ 106 and $C_R$ 108 is indicative of the charge collected in the floating diffusion area 102. Typically, all the pixels 100 in a same row are processed simultaneously. The signals are sampled onto capacitors $C_S$ and $C_R$ in their respective column readout circuits collectively arranged beneath the row (or multiple rows: array 10) of pixels. After a row sampling process is complete, voltage signal Vout_S, Vout_R in each column is read out successively by successively enabling the associated n-channel column selection transistors 110, 111. A high level block diagram of an array of pixels 10 and associated linear array 10' of corresponding column readout circuits 101, arranged in parallel fashion, is shown in FIG. 3. The outputs of Vout_R and Vout_S of column readout circuits 101 each share a common readout line.

Figure 4:
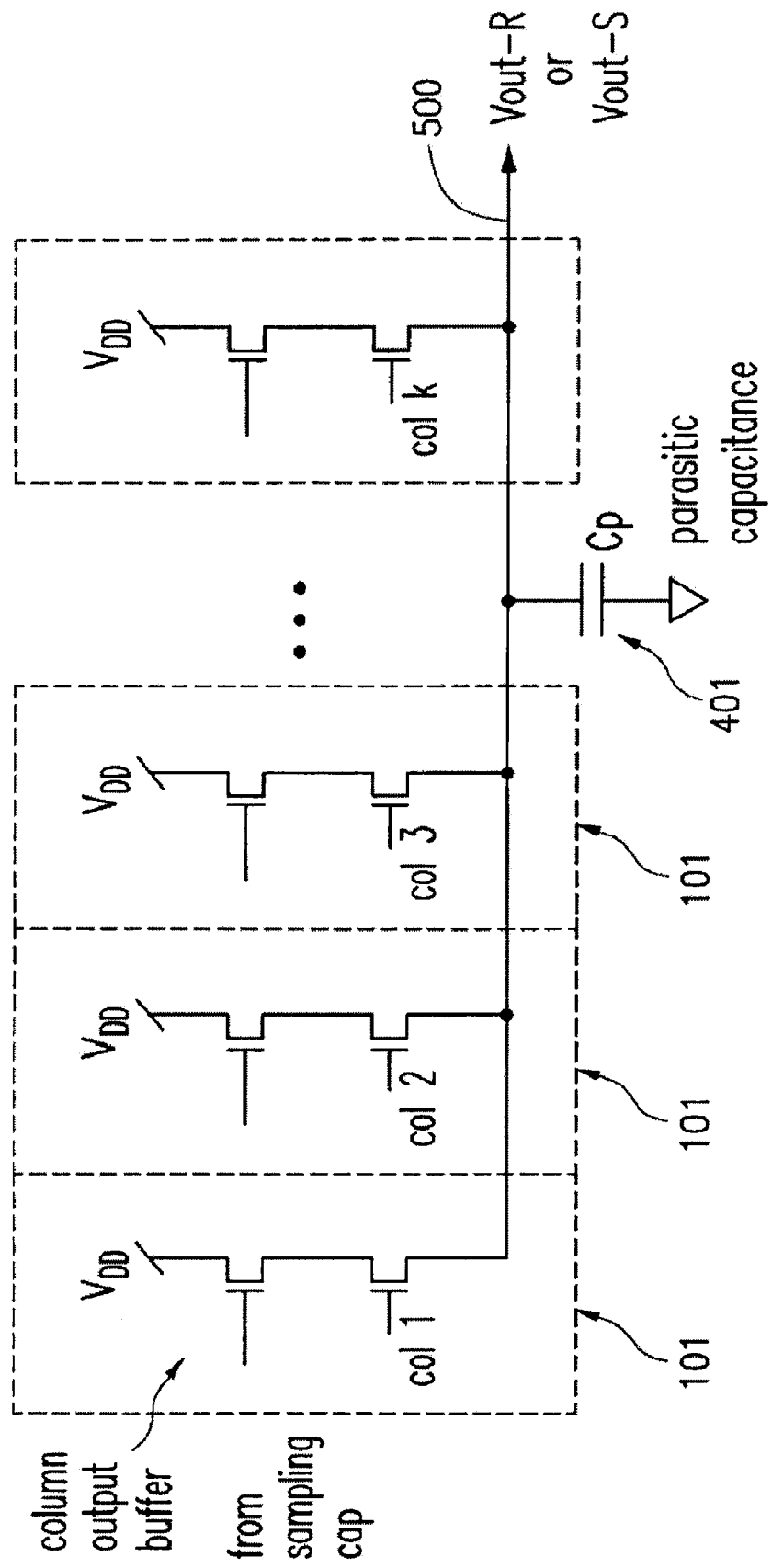
FIG. 4 shows a simplified schematic diagram of a portion of an output stage for each of plural column readout circuits and the parasitic capacitance effects contributed thereby.

FIG. 4 is a simplified partial schematic diagram of the respective output stages of the column readout circuits 101 in a linear array of pixels 10'. Each column output stage contributes a parasitic capacitance resulting in an effective load capacitance of Cp, represented by capacitor 401. Assuming Ci to be the parasitic capacitance contributed by each column circuitry, total parasitic capacitance and total RC time constant (charge and discharge) turn-on/off settling time, may then be represented as follows:

$$Cp1 = mCi \qquad \text{eq. (1)}$$

$$RCp1 = mRCi \qquad \text{eq. (2),}$$

where R is the built-in resistance associated with each of column select transistors 110, 111 in the ON state, and m is the total number of column readout circuits 101 in a column-addressable row.

As explained above, column readout circuit 101 output signals (Vout_S and Vout_R) are each connected to a pair of corresponding shared column readout lines. An image sensor with a horizontal resolution of 1000 pixels could theoretically result in the column output stage of a selected column readout circuit 101 having to drive the load capacitance associated with the other 999 columns. The parasitic capacitance in such a case could effectively be in the tens or even hundreds of picofarads.

A larger capacitance requires longer time to charge the capacitance to a desired voltage value, and results in a greater RC time constant which translates into greater settling time. To increase pixel readout rate at a predetermined maximum frame rate necessarily involves minimizing the effective load capacitance seen by a selected column output buffer (transistor 110, 111).

Settling time may be improved by increasing the biasing current on the column output buffer. The time to charge up a capacitance to a certain voltage is well known and may be represented by the following equation:

$$I_{avg} = C\frac{dV}{dt}$$

$$dt = \frac{C}{I_{avg}}dV$$

Increasing the current would mean more power dissipation since $P_{diss} = V*I$. For portable video systems, power dissipation is a key issue because higher power dissipation would reduce the lifetime of the battery. The present inventor has determined this not a desirable or optimum solution.

Figure 5:
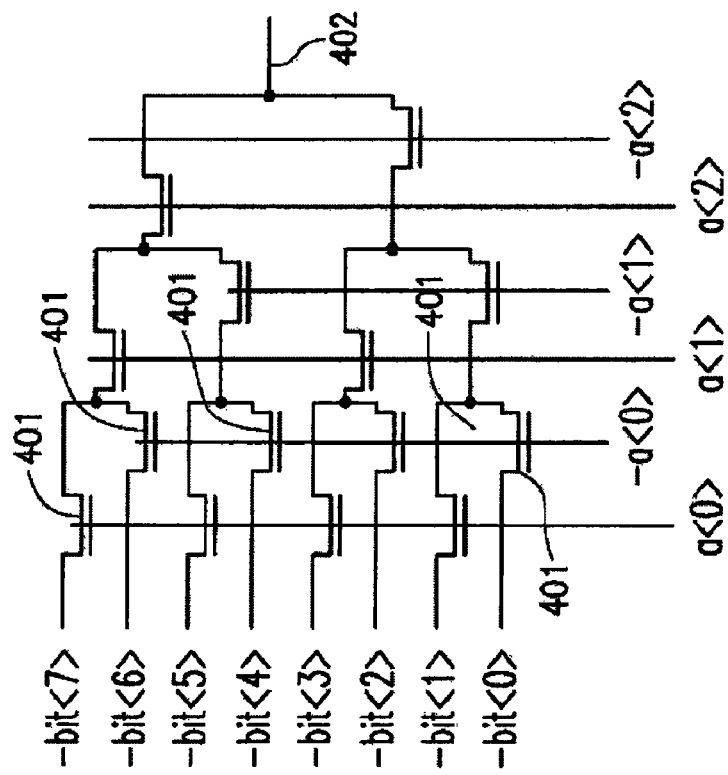
FIG. 5 shows a tree-style column decoder and multiplexer.

Settling time may also be reduced by reducing the effective load capacitance on the column output buffer. A technique for reducing effective load capacitance for faster readout is called tree-style column decoding. An example of a RAM tree-style column decoder and multiplexer is shown in FIG. 5. Data bit lines are coupled to a pool of switches (transistors 401) which are selectively enabled to drive only a desired data bit through to a shared bit line 402. In the configuration shown, a selected bit line receives a parasitic capacitance contribution from at least four transistors. With such a scheme, however, the overall effective capacitance seen on the shared bit line 402 can be reduced by as much as half that which might be imparted were all eight bit lines to be directly coupled to shared bit line 402 by only a single parallel bank of eight transistors.

Tree-style column decoding reduces the effective capacitance seen by each bit output line.

The present inventor has discovered that by splitting the column circuitry into different blocks, as will be explained in greater detail below, the readout bus capacitance seen by a currently selected column output stage could be significantly reduced beyond that possible by known to techniques.

In accordance with a preferred embodiment, the load capacitance is mathematically modeled. The effective RC constant seen by any column output stage at a particular time is determined. By using a differentiated derived equation, a desirable optimum number of connections per block as well as a desired number of blocks for a given size of column readout circuits can be easily determined from this equation.

Figure 6:
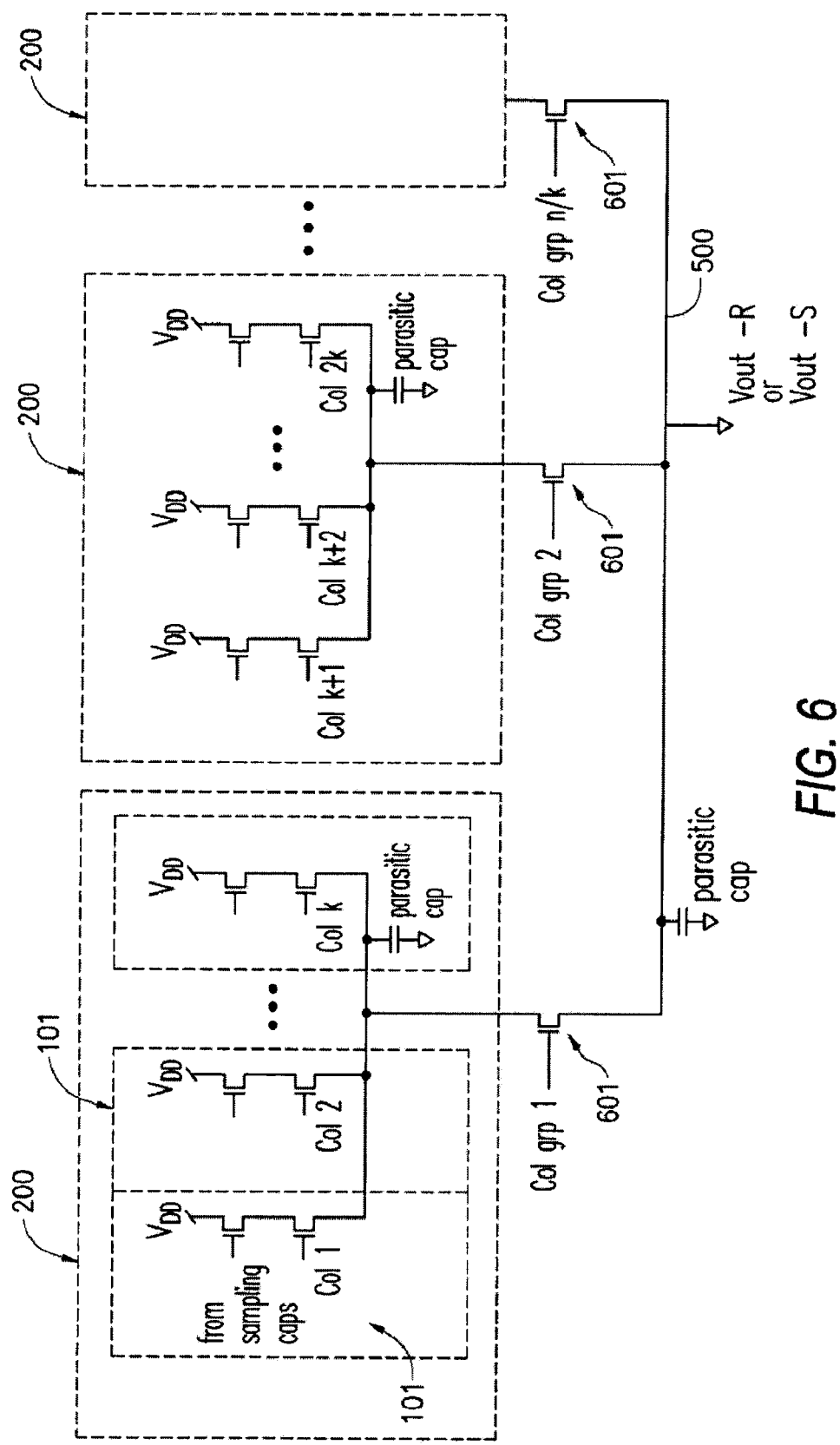
FIG. 6 shows the grouping of column readout circuits in blocks of k across an m-pixel linear array.

An improved configuration for coupling the column output stages resulting in reduced parasitic capacitance effects is illustrated in FIG. 6. FIG. 6 shows the column readout circuits 101. Only one portion of the respective column output stage is shown. These are logically divided up into blocks 200, each comprised of k contiguous columns readout circuits. A set of block switches (n channel transistors) 601 are used to select among the blocks 200. Each switch 601 functions as a block select switch allowing the column readout circuits 101 in a given block to become actively coupled to the shared column readout line 500. Block switches 601 are used to select among the blocks 200 every time an associated column readout circuit 101 is to be turned ON. Once a column readout circuit 101 is selected for readout, its corresponding block switch 601 is also selected, but none of the other block switches are selected. Those blocks 200 which are not selected prevent or block associated column readout circuits from imparting a parasitic capacitance on the shared readout line 500, and/or on the column output stage of the currently active column readout circuit.

Block switches 601 also collectively impart a proportionate parasitic capacitance on the currently active column readout circuit, regardless of whether or not they are connected. Thus, in an arrangement of 64-wide block column readout circuits servicing a 1024-pixel wide row, there would be a total 1024/64=8 blocks. Each of the eight block switch transistors 601 would impart a parasitic capacitance of its own. This capacitance of eight transistors, however, is much less than the collective capacitance of 1024 non-blocked column select transistors. In this regard, it might be said that block select switches 601 function as parasitic capacitance blockers.

The present inventor has determined that the optimum number of column readout circuits 101 per block 200 (i.e., the optimum value of k) for a given size pixel configuration may be calculated from the following mathematical quadratic relation, $$C_{p2} = (k + 2 + m/k)C_i, \qquad \text{eq. (3)}$$

for k (n-channel) column select transistors (110 or 111) and m/k groups, where m is the total number of column readout circuits 101. The numeral 2 constant is derived from the parasitic capacitance of the group selection (nmos) transistor of the particular block being selected. This is based on a previous assumption that Ci is the parasitic capacitance of the source/drain diffusion of the nmos selection transistor.

Minimizing $C_{p2}$ in eq. (3) by differentiating $C_{p2}$ with respect to k and equating it to zero, we get:

$$(1 - m/k)C_i = 0, \qquad \text{eq. (4)}$$

solving for k, $$k = m^{1/2},$$

then substituting the value of k back into eq. (3), we get:

$$C_{p2} = (2m^{1/2} + 2)C_i. \qquad \text{eq. (5)}$$

Now, since each block switch transistor 601 is in series with a selected column output buffer (transistors 110 or 111), the result is a doubling in the effective resistance R imparted on each associated Vout_S, Vout_R column readout line 500. The doubled resistance impacts doubly on the RC time constant settling time. This doubled resistance may be mathematically represented in terms of a relevant time constant from equations (2) and (3) as:

$$RC_{p2}=2\times(2m^{1/2}+2)*RC_I. \quad \text{eq. (6)}$$

From the above, a parasitic capacitance improvement (or reduction) between $C_{p1}$ (without block switching) and $C_{p2}$ (with block switching) may be expressed as a ratio $C_{p1}:C_{p2}$ as $$m:2m^{1/2}+2, \quad \text{eq. (7)}$$

for large m, $2m^{1/2}+2$, approximates to $2m^{1/2}$, substituting back in eq. (7), we get a ratio of $$m:2m^{1/2}, \text{ which equates to a ratio of } m^{1/2}:2.$$

Thus, for large m (e.g, 512, 1024, or greater), parasitic capacitance is effectively reduced by a factor of about $m^{1/2}/2$. In a 1024-row architecture having block switching and an optimum block size of 32 ($k=m^{1/2}$), a parasitic capacitance reduction of 16 ($=m^{1/2}/2=32/2$) may be realized over the case where no block switching is utilized.

A similar analysis may be used to determine RC time constant improvement (or reduction) in the cases where there is no block switching ($RC_1$) versus the case where block switching ($RC_2$) is provided.

Representing the two cases by $RC_{p1}:RC_{p2}$, from equations (6) and (7), we get $$m:2\times(2m^{1/2}+2). \quad \text{eq. (8)}.$$

Here again, for large m, $$2m^{1/2}+2, \text{ approximates to } 2m^{1/2},$$

substituting back in eq. (8), the ratio can be expressed as $$m:4m^{1/2},$$

which equates to a ratio of $m^{1/2}:4$.

Thus it is shown that block switching can reduce the effective RC constant by a factor of about $m^{1/2}/4$. Accordingly, for a pixel array of 1024×1024, the parasitic capacitance may be reduced by a factor of 8×2 ($=1024^{1/2}/4\times2$), while the RC time constant is reduced by a factor of 8, by utilizing block switching. In a 32 ($1024^{1/2}$) block orientation, each column output stage is imparted an effective loading equivalent to having 1024/16=64 columns connected together.

Figure 7:
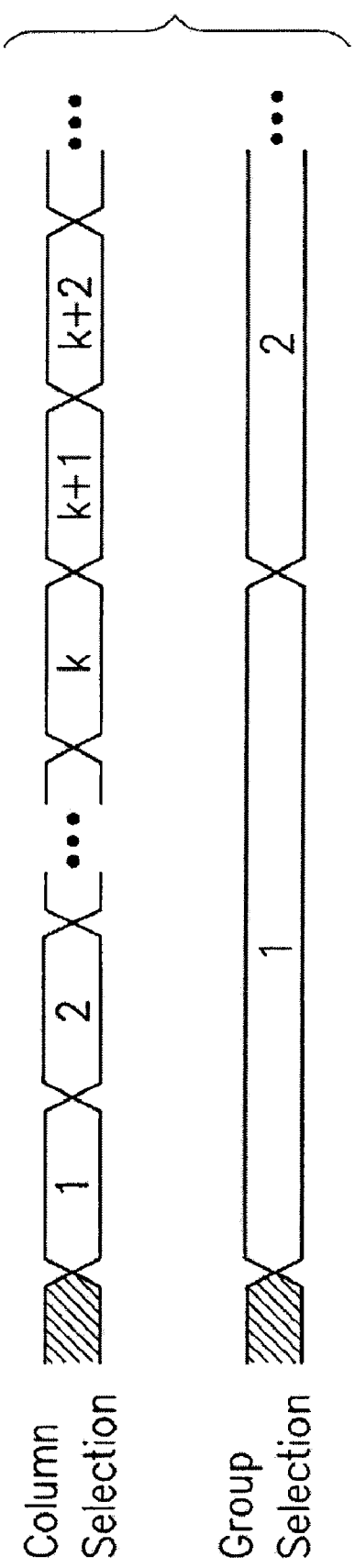
FIG. 7 shows the timing for column readout and column group selection in accordance with a preferred implementation of the present disclosure.

FIG. 7 shows the timing for effecting column selection in block group fashion in accordance with a preferred implementation in which it is contemplated that the column read out circuits 101 in a given block will be readout first. After all the columns in the block have been read out, the associated block switch is disabled, and the block switch associated with the next column readout circuit to be read out is enabled (turned ON).

The present implementation has been described having only one level of block switches. Another embodiment uses multiple levels of cascaded stages of block switching to further reduce the effective parasitic capacitance seen by a selected column output stage.

In summary, the present solution provides a way for reducing the effective load capacitance thereby allowing for an increase in pixel readout rate without any increase in power dissipation. It is contemplated however that the present solution also allows for a way to improve (reduce) power dissipation in applications where a low pixel readout is desirable.

As should be readily apparent from the above discussion of the preferred embodiments, block switching provides additional advantages beyond those in conventional tree-style decoding. A typical tree-style single stage implementation decoding method reduces the effective load capacitance by a factor of 2. For n cascaded stages, the load capacitance is reduced by a factor of $2^n$ at the expense of very high circuit complexity. The non-cascaded system of FIG. 6 with a large image array with a horizontal resolution of 1024 could have its effective capacitance reduced by a factor of 16.

This system can also increase the pixel readout rate (due to faster settling time) without any increase in the biasing current of the column output stages, and without introducing substantial circuit complexity to the overall active pixel sensor column readout architecture.

Although only a few embodiments have been described in detail, those having ordinary skill in the art would certainly understand that many modifications are possible in the preferred embodiment without departing from the teachings thereof. For example, although the block switching is described in terms of "rows", the blocks could be columns or any other shape of blocks.

All such modifications are intended to be encompassed by the following claims.

What is claimed is:

1. An image sensor, comprising:
    a pixel array comprising a plurality of pixels, organized into N selectable rows and M columns, wherein N and M are positive integers;
    M column output circuits, each of which can be actively coupled to pixels in the N rows in a respective column, each of said M column output circuits for respectively outputting a respective signal corresponding to a respective pixel of a selected row, said M column output circuits being organized into B blocks, B being a positive integer greater than 1, each of said B blocks comprising k of said M column output circuits, wherein k is a positive integer greater than 1 and k=M/B;
    B block output lines each for receiving signals from said k column output circuits of a respective block; and
    selection circuitry between said B block output lines and a master output line for actively coupling a single one of said B block output lines to said master output line at a time and thereby allow said k column output circuits associated with an actively coupled block output line to be actively coupled to said master output line through said selection circuitry.

2. The image sensor of claim 1, wherein in each block, said k column output circuits are associated with consecutive pixels in said selected row, k is greater than two, and B is greater than two.

3. An image sensor, comprising:
    a pixel array comprising a plurality of pixels, organized into N rows and M columns, wherein N and M are positive integers;
    M output circuits, each of said M output circuits for respectively outputting a respective signal associated with a respective one of M pixels of a selected row, wherein said M output circuits are organized into B blocks, B being a positive integer greater than two, each of said B blocks comprising k of said M output circuits, wherein k is a positive integer such that k=M/B;
    B block output lines each coupled to said k output circuits of a respective block;
    a master output line; and
    a selection circuit, for actively coupling a single one of said B block output lines to said master output line at a time.

4. The image sensor of claim 3, wherein M is at least 1024 and k is at least 32.

5. The image sensor of claim 3, wherein said image sensor is configured to control said selection circuit to sequentially select each of said B blocks by actively coupling a respective one of said block output lines of a respective selected block to said master output line.

6. The image sensor of claim 5, wherein said image sensor is further configured to sequentially cause each of said k output circuits of said respective selected block to be actively coupled to said master output line via said respective one of said block output lines of said respective selected block.

7. The image sensor of claim 3, wherein said selection circuit comprises:
B switches, each of said B switches respectively associated with one of said B blocks to couple a respective one of the B block output lines with the master output line.

8. The image sensor of claim 7, wherein each of said B switches is a respective N-channel transistor having one source/drain connected to a respective one of said B block output lines of an associated one of said B blocks and another source/drain connected to the master output line.

9. The imager of claim 8, wherein in each block, said k column output circuits are associated with consecutive pixels in said selected row.

10. A CMOS imager, comprising:
a pixel array comprising a plurality of pixels, organized into N rows and M columns, wherein N and M are positive integers;
M column output circuits, each of which can be actively coupled to the N rows in a column, each of said M output circuits to output a respective signal associated with a respective pixel of a selected row, wherein said M column output circuits are organized into B blocks, B being a positive integer greater than two, each of said B blocks comprising k of said M column output circuits, wherein k is a positive integer greater than 1 and k=M/B;
B block output lines each connected to said k column output circuits of a respective block; and
a selection circuit configured to actively couple a single one of said B block output lines to a master output line at a time and thereby allow said k column output circuits associated with an actively coupled block output line to be actively connected to said master output line through said selection circuit.

11. The imager of claim 10, wherein said system is configured to control said selection circuit to sequentially select each of said B blocks by actively coupling said single one of said B block output lines of a selected block to said master output line.

12. The imager of claim 11, wherein said imager is further configured to sequentially cause each of said k column output circuits of said selected block to be actively coupled to said master output line via said single one of said B block output lines of said selected block.

13. The imager of claim 10, wherein said selection circuit comprises:
B switches, each of said B switches respectively associated with one of said B blocks to couple a respective one of the B block output lines with the master output line.

14. The imager of claim 13, wherein each of said B switches is a respective N-channel transistor having one source/drain connected to a respective one of said block output lines of an associated block and another source/drain connected to the master output line.

15. A CMOS imager, comprising:
a pixel array comprising a plurality of pixels, organized into N rows and M columns, wherein N and M are positive integers; and
M output circuits, each of said M output circuits for respectively outputting signals from M pixels of a selected row;
wherein said M output circuits are organized into B blocks, B being a positive integer, each of said B blocks comprising k of said M output circuits, wherein k is a positive integer such that k=M/B; B block output lines each coupled to said k output circuits of a respective block;
a master output line; and
a selection circuit, for actively coupling a single one of said B block output lines to said master output line at a time.

16. The imager of claim 15, wherein M is at least 1024 and M and k are greater than two.

17. A method of reading out signals of a selected row in an imager having pixels arranged in N rows by M columns through M column output circuits, the method comprising:
(a) operating said M column output circuits in B groups each having k column output circuits and a respective common group output line, each of said M column output circuits coupled to the N rows of a respective column;
(b) actively coupling only said respective common group output line of a selected one of said B groups to a master output node to receive said signals; and
(c) reading out said signals from each of said k column output circuits in the selected one of said B groups;
wherein M, B, and k are integers greater than two.

18. The method of claim 17, further comprising:
repeating steps (b) and (c) until said signals of all pixels of the selected row have been read out to said common output mode.

19. The method of claim 18, wherein in step (b) groups are selected in sequential order and in step (c) pixels of the selected group are read out in sequential order.

20. A method of reading out pixel signals of a selected row in an imager having pixels arranged in N rows by M columns through M output circuits, the method comprising:
(a) operating said M output circuits in B groups each having k output circuits and a common group output line;
(b) selecting only one at a time of said B groups by actively coupling said common group output line of a selected group to a master output node;
(c) reading out pixel signals from each of said k output circuits in the selected group; and
wherein M, B, and k are integers.

21. The method of claim 20, wherein M is greater than 1024 and k is more than two.

22. An imaging device, comprising:
an array of pixels, including source follower transistors, wherein a first set of adjacent columns of pixels of the array are connected to a first set of column output lines, and a second set of adjacent columns of pixels of the array are connected to a second set of column output lines;
a first set of greater than two column output circuits connected to the first set of column output lines to provide a first set of signals associated with a first set of pixels in a selected row and in the first set of adjacent columns, and a second set of greater than two column output circuits connected to the second set of column output lines to provide a second set of signals associated with a second set of pixels in the selected row and in the second set of adjacent columns; and
a first block select switch connected between the first set of column output circuits and a first array readout line and a second block select switch connected between the second set of column output circuits and the first array readout line, wherein the first block select switch, when enabled, allows the first set of signals to be driven onto the first array readout line, the second block select switch, when enabled, allows the second set of signals to be driven onto the first array readout line, and the first and second block select switches are to be enabled one-at-a-time.

23. The imaging device of claim 22, wherein the pixels include row select transistors.

24. The imaging device of claim 22, further comprising a first set of greater than two column output select switches connected to the first block select switch, and a second set of greater than two column output select switches connected to the second block select switch, wherein the first set of column output select switches are to be enabled one-at-a-time to allow the first set of signals to be driven to the first block select switch, and the second set of column output select switches are to be enabled one-at-a-time to allow the second set of signals to be driven to the second block select switch.

25. The imaging device of claim 24, wherein the first and second sets of column output select switches comprise n-channel transistors having first source/drain electrodes connected to receive the first and second sets of signals, respectively, second source/drain electrodes connected to provide the first and second sets of signals to the first and second block select switches, respectively, and gate electrodes connected to receive column output select signals.

26. The imaging device of claim 24, wherein the first set of column output select switches are to be enabled successively, and the second set of column output select switches are to be enabled successively.

27. The imaging device of claim 24, wherein the first set of column output select switches are to be enabled only while the first block select switch is enabled, and the second set of column output select switches are to be enabled only while the second block select switch is enabled.

28. The imaging device of claim 24, further comprising a first set of greater than two column output buffers connected to the first set of column output select switches to allow the first set of signals to be driven to the first set of column output select switches, and a second set of greater than two column output buffers connected to the second set of column output select switches to allow the second set of signals to be driven to the second set of column output select switches, wherein the first set of column output buffers comprises transistors having gate electrodes connected to receive the first set of signals and source/drain electrodes connected to provide the first set of signals to the first set of column output select switches, and the second set of column output buffers comprises transistors having gate electrodes connected to receive the second set of signals and source/drain electrodes connected to provide the second set of signals to the second set of column output select switches.

29. The imaging device of claim 22, wherein the first set of column output circuits is to further provide a third set of signals associated with the first set of pixels in the selected row and in the first set of adjacent columns, and the second set of column output circuits is to further provide a fourth set of signals associated with the second set of pixels in the selected row and in the second set of adjacent columns, and further comprising:

a third block select switch connected between the first set of column output circuits and a second array readout line, and a fourth block select switch connected between the second set of column output circuits and the second array readout line, wherein the third block select switch, when enabled, allows the third set of signals to be driven onto the second array readout line, the fourth block select switch, when enabled, allows the fourth set of signals to be driven onto the second array readout line, and the third and fourth block select switches are to be enabled one-at-a-time.

30. The imaging device of claim 29, wherein at least the first and third sets of signals together indicate an amount of charge collected by the first set of pixels, and at least the second and fourth sets of signals together indicate an amount of charge collected by the second set of pixels.

31. The imaging device of claim 30, wherein a difference between the first and third sets of signals indicates the amount of charge collected by the first set of pixels.

32. The imaging device of claim 29, further comprising a first set of greater than two column output select switches connected to the first block select switch, a second set of greater than two column output select switches connected to the second block select switch, a third set of greater than two column output select switches connected to the third block select switch, and a fourth set of greater than two column output select switches connected to the fourth block select switch, wherein the first set of column output select switches are to be enabled successively to allow the first set of signals to be driven to the first block select switch, the second set of column output select switches are to be enabled successively to allow the second set of signals to be driven to the second block select switch, the third set of column output select switches are to be enabled successively to allow the third set of signals to be driven to the third block select switch, and the fourth set of column output select switches are to be enabled successively to allow the fourth set of signals to be driven to the fourth block select switch.

33. The imaging device of claim 32, wherein the first set of column output select switches are to be enabled only while the first block select switch is enabled, the second set of column output select switches are to be enabled only while the second block select switch is enabled, the third set of column output select switches are to be enabled only while the third block select switch is enabled, and the fourth set of column output select switches are to be enabled only while the fourth block select switch is enabled.

34. The imaging device of claim 32, wherein the first set of column output select switches are to be enabled one-at-a-time, the second set of column output select switches are to be enabled one-at-a-time, the third set of column output select switches are to be enabled one-at-a-time, and the fourth set of column output select switches are to be enabled one-at-a-time.

35. The imaging device of claim 22, wherein the first block select switch comprises an n-channel transistor connected to the first set of column output circuits.

36. The imaging device of claim 35, wherein a source/drain electrode of the transistor is connected to the first set of column output circuits.

37. The imaging device of claim 22, wherein the first set of adjacent columns of pixels is adjacent to the second set of adjacent columns of pixels, and the first and second block select switches are to be activated successively.

38. The imaging device of claim 22, wherein each column output circuit of the first set of column output circuits produces at least two respective signals associated with a respective voltage indicative of charge collected by a respective pixel in the selected row of the array during a row readout.

39. The imaging device of claim 38, wherein at least one of the at least two respective signals associated with the respective voltage is an analog signal.

40. The imaging device of claim 22, wherein a third set of adjacent columns of pixels of the array are connected to a third set of column output lines, and further comprising a third set of greater than two column output circuits connected to the third set of column output lines to provide a third set of signals associated with a third set of pixels in the selected row and in the third set of adjacent columns, and a third block select switch connected between the third set of column output circuits and the first array readout line, wherein the third block select switch, when enabled, allows the third set of signals to be driven onto the first array readout line, and the first, second, and third block select switches are to be enabled one-at-a-time.

41. The imaging device of claim 40, wherein each of the first and second sets of column output circuits comprise at least 32 respective column output circuits.

42. A method, comprising:
generating first signals associated with a first row of pixels of an array of pixels of a CMOS imager during a frame readout;
transferring each of at least eight groups of signals selected from the first signals to a respective one of at least eight block output busses, wherein each of the groups of signals selected from the first signals are associated with adjacent pixels in the first row of pixels of the array; and
transferring only a single one of the groups of signals selected from the first signals from a respective one of the block output busses to a master readout bus at a time.

43. The method of claim 42, wherein transferring the groups of signals to the block output busses comprises transferring only a single one of the first signals of a corresponding one of the groups to the respective one of the block output buses at a time.

44. The method of claim 43, wherein in accordance with reading out the array from the array readout bus the column output circuits are to be enabled successively.

45. The method of claim 42, further comprising:
generating second signals associated with the first row of pixels of the array during the frame readout;
transferring each of at least eight groups of signals selected from the second signals to a respective one of the at least eight block output busses, wherein each of the groups of signals selected from the second signals are associated with adjacent pixels in the first row of pixels of the array; and
transferring only a single one of the groups of signals selected from the second signals from a respective one of the block output busses to the master readout bus at a time.

46. The method of claim 42, wherein generating the first signals and generating the second signals is completed at different times.

47. The method of claim 43, wherein generating the first signals and generating the second signals is begun at different times.

48. The method of claim 42, wherein generating the first signals and generating the second signals comprises storing the first and second signals in column output circuits during a same period of time.

49. The method of claim 48, wherein each pixel of the first row of pixels has a respective pixel value indicated by at least each respective corresponding one of the first signals and each respective corresponding one of the second signals.

50. The method of claim 49, further comprising determining a difference between said each respective corresponding one of the first signals and said each respective corresponding one of the second signals.

51. The method of claim 49, wherein each of the groups of signals selected from the first signals comprises more than two of the first signals.

52. The method of claim 46, wherein transferring the groups of signals selected from the first signals to the master readout bus and transferring the groups of signals selected from the second signals to the master readout bus comprise transferring the groups of signals selected from the first signals and transferring the groups of signals selected from the second signals to different lines of the master readout bus.

53. The method of claim 42, wherein each of the groups of signals selected from the first signals comprises more than two of the first signals.

54. The method of claim 42, wherein transferring the groups of signals to the master readout bus comprises passing at least one of the first signals through at least one transistor channel.

55. The method of claim 54, wherein transferring the groups of signals to the block output busses comprises passing at least one of the first signals through at least one transistor channel.

56. The method of claim 42, wherein transferring the groups of signals to the master readout bus comprises successively transferring each of the groups of signals and successively transferring the respective signals within each of the groups.

* * * * *